United States Patent Office 3,215,679
Patented Nov. 2, 1965

3,215,679
PROCESS FOR THE PREPARATION OF POLYMERS OF ISOPRENE AND BUTADIENE
William J. Trepka, Bartlesville, Okla., assignor to Phillips Petroleum Company, a corporation of Delaware
No Drawing. Filed Dec. 22, 1961, Ser. No. 161,411
8 Claims. (Cl. 260—82.1)

This invention relates to the polymerization of isoprene and butadiene to form rubbery polymers having improved properties. In one aspect the invention relates to a process for producing polymers of butadiene and isoprene.

In recent years there has been a great deal of activity in the development of processes for producing olefin polymers. Polymers of monoolefins, such as ethylene and propylene prepared by these processes, have received wide acceptance by many industries. A more recent discovery in the field of diene polymerization of certain so-called stereospecific initiator systems makes possible the formation of polymers having a desired configuration. The polymers formed by the use of these initiator systems often have outstanding physical properties which render them equal to or even superior to natural rubber. While the polymerization of butadiene and isoprene has been effected in the presence of stereospecific initiators, such as butyllithium and related lithium alkyls, results are frequently erratic since these systems are frequently extremely sensitive to the presence of impurities. More recently organolithium compounds which are sparingly soluble in hydrocarbon media, and precipitate therefrom when prepared in the presence of hydrocarbon diluents, have been employed with much greater satisfaction as initiators for isoprene and butadiene polymerization. Within this group of sparingly soluble organolithium compounds it has now been discovered that there is a select group of materials which gives exceptional results when employed as initiators for the polymerization of isoprene and butadiene.

It is an object of this invention to provide a process for the polymerization of butadiene and isoprene.

It is yet another object of the invention to provide a process for producing rubbery polymeric products having improved properties.

Another object of the invention is to provide an improved process for producing polymers of butadiene and isoprene.

It is yet another object of the invention to provide an improved process for producing polymers of isoprene having a high percentage of cis-1,4-addition.

Still another object of the invention is to provide a method for controlling the physical properties, particularly the inherent viscosity, of polymers of butadiene and isoprene.

These and other objects and advantages of the invention will become apparent to those skilled in the art upon consideration of the accompanying disclosure and the appended claims.

These and other objects of the invention are broadly accomplished by contacting a monomer selected from the group consisting of butadiene and isoprene and mixtures thereof under polymerization conditions with an initiator selected from the group consisting of (A) 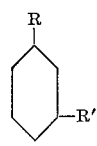

(B) 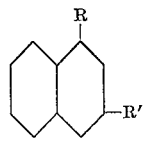

and mixtures of (A) and (B) wherein R and R' are selected from the group consisting of lithium and a halogen, said halogen being selected from the group consisting of fluorine, bromine, and chlorine, at least one of R and R' being lithium, and recovering the polymer thus produced.

In one embodiment of the invention the physical properties, particularly the inherent viscosity, of the polymer of butadiene or isoprene are controlled by contacting the monomer under polymerization conditions with an initiator comprising a mixture of a 1,3-dilithiumaryl compound and a monohaloaryllithium compound as hereinbefore defined, adjusting the physical properties of the polymer by varying the molar ratio of the initiator components and recovering the polymer thus produced.

The organolithium compounds with which this invention is concerned include 1,3-dilithiobenzene, 3-bromophenyllithium, 3-bromo - 1 - naphthyllithium, 3-chlorophenyllithium, 3-chloro-1-naphthyllithium, 3-fluorophenyllithium, 3-fluoro-1-naphthyllithium, 1 - chloro-3-naphthyllithium, 1-fluoro-3-naphthyllithium, 1-bromo-3-naphthyllithium, and mixtures of the foregoing compounds. Presently preferred compounds include 1,3-dilithiobenzene, 3-bromophenyllithium, and mixtures thereof.

It is surprising that when these initiators are employed for the polymerization of isoprene and butadiene both the resultant structure and inherent viscosity of the polymer are much less sensitive to changes in initiator level than when other organolithium compounds are used. Furthermore, the isoprene polymers have a consistently higher cis-content than is often obtained with other initiators, and in spite of the high inherent viscosity, the polymers process easily. Another advantage in the imployment of these initiators is that the induction periods are relatively short whereas longer induction periods are generally encountered in other sparingly soluble initiator systems, e.g., a lithium-methylnaphthalene initiator. It has generally been observed when using organolithium initiators that as the initiator level is increased there is a decrease in cis-content. This effect is particularly noticeable with the so-called hydrocarbon soluble initiators, such as butyllithium. The initiators of this invention do not demonstrate this behavior but show only relatively small changes in cis-content even though there is considerable variation in initiator level. This fact renders the initiators herein described of great value for the polymerization of isoprene and butadiene. These effects are quite different when well-known initiators, such as 1,4-dilithiobenzene or the 4-halophenyllithiums, are substituted for the 1,3-derivatives. Results with the 1,4-compounds are generally more erratic, higher initiator levels are generally required for polymerization, induction periods are longer, conversions are frequently lower, inherent viscosity is generally lower, and cis-contents are often lower than when the 1,3-compounds are used.

The organolithium compounds employed as initiators in this invention can be prepared by any method desired. One suitable procedure is to react a 1,3-dihaloaryl compound, such as 1,3-dibromobenzene or 1,3-dibromonaphalene, with an alkyl lithium, such as butyllithium. The 1,3-dilithio compound is formed by treating the aromatic halogen compound with at least 2 moles of the alkyllithium in order to replace all the halogen on the aromatic ring with the lithium. If only 1 mole of alkyllithium is used the product would be a monohaloaryllithium, such as 3-bromophenyllithium. Thus, by varying the molar quantity of alkyllithium reactant, various mixtures of 1,3-dilithiobenzene with a 3-halophenyllithium can be readily obtained. It is to be understood that regardless of the method of preparation various mixtures of 1,3-dilithioaryls with a monohaloaryllithium compound as hereinbefore described, are applicable as initiators within the scope of this invention.

The monohaloaryllithium compounds are similar to 1,3-dilithioaryl compounds in their effect on the polymerization of isoprene and butadiene in that the structure and inherent viscosity of the polymers are not very sensitive to changes in the initiator level. One difference however has been observed. A polymer prepared employing a monohaloaryllithium, such as 3-bromophenyllithium, as the initiator usually has an inherent viscosity lower than that obtained when using a 1,3-dilithioaryl compound, yet the cis-content remains high. By using mixtures of a 1,3-dilithioaryl compound and a monohaloaryllithium compound, a means is thus provided for adjusting inherent viscosity with no sacrifice in cis-content. This is another of the many advantages realized through the use of this select group of initiators.

When mixtures of the initiators are employed the ratios of the various components can be varied as desired, the ratio of 1,3-dilithioaryl compound and monohaloaryllithium may be varied from all of one component to all the other component and all combinations in between. The particular combination depends on the physical properties of the polymer desired.

The quantity or amount of the initiator employed during the polymerization can vary appreciably depending on the initiator selected as well as the polymerization conditions. The amount or quantity is generally expressed in terms of milliequivalents of lithium per 100 grams of monomer. Generally the quantity employed is that which contains from 2 to 80 milliequivalents of lithium per 100 grams of monomer with a preferred amount of from 5 to 60 milliequivalents of ltihium per 100 grams of monomer.

It is preferred that the initiator be prepared and the polymerization be carried out in the presence of an inert gas atmosphere such as argon, helium, nitrogen and the like.

The temperature employed for polymerization according to the invention is generally in the range of —100 to 150° C., preferably from —75 to 75° C. The particular temperature employed depends upon both the monomer and the initiators used in the polymerization. The pressure employed during polymerization need be only that necessary to maintain the reaction mixture substantially completely in a liquid phase.

The polymerization of the monomer in the presence of the hereindescribed organolithium compounds according to the invention is preferably carried out in the presence of a suitable diluent such as benzene, toluene, cyclohexane, methylcyclohexane, xylene, normal butane, normal hexane, normal pentane, normal heptane, isooctane, or mixtures thereof and the like. Generally the diluent is selected from hydrocarbons, for example, paraffins, cycloparaffins and aromatics containing from 4 to 10, inclusive, carbon atoms per molecule.

The organolithium polymerization initiator can be prepared in a hydrocarbon or polar medium. Hydrocarbons of the same types used for the polymerization are applicable as well as materials which boil at a temperature above 200° C. When a polar solvent is used for the initiator preparation, it is desirable that it be replaced with a hydrocarbon diluent. The relatively high boiling or heavy hydrocarbon dispersing medium is advantageous in that it serves to coat the organolithium particles and keeps them in a highly dispersed form as well as rendering them non-pyrophoric and consequently easy to handle. Further details of this method are described in the copending application of Gerald R. Kahle and Carl A. Uraneck, Serial Number 137,013, filed September 11, 1961.

The organolithium compound can be pretreated to reduce the induction period encountered in polymerization. One method comprises heating the reaction mixture prior to polymerization by maintaining it at an elevated temperature for a period of time of at least 5 minutes but insufficient to effect any substantial degree of polymerization, and then reducing the temperature of the reaction mixture and completing the polymerization at the reduced temperature. Preferred temperature ranges for pretreating are from about 60 to about 110° C., preferably 65 to 90° C. The polymerization step then takes place at a temperature below 60° C., generally in the range of —100 to 55° C.; preferably between —75 and 50° C. A preferred method of pretreating the catalyst is described in the copending application of Gerald R. Kahle, Serial Number 137,014, filed September 11, 1961 and now abandoned.

The products resulting from the polymerization of butadiene and isoprene are obtained as solutions which can be treated with various reagents to produce functional groups by replacing the terminal lithium atoms on the polymer molecules resulting from the polymerization itself. For example, polymer in solution can be contacted first with carbon dioxide and then with an acid to replace the lithium atoms with —COOH groups. Other functional groups which can be introduced include —SH, —OH, and the like. Alternatively, the unquenched polymer solutions can be treated with an alcohol or other reagent to inactivate the initiator and/or precipitate polymer which is then recovered without functional groups.

The rubbery polymers of isoprene or butadiene produced in accordance with this invention can be compounded by any of the know methods such as have been used in the past for compounding rubbers. Vulcanizing agents, vulcanization accelerators, accelerator activators, reinforcing agents, antioxidants, softeners, plasticizers, fillers and other compounding ingredients such as have been normally employed in rubbers can likewise be used in the polymers of this invention. The rubbery diene polymers have utility in applications where both natural and synthetic rubbers are used. In addition, the rubbery polymers produced by the method of this invention can be blended by any suitable method with other synthetic rubbers and/or natural rubber. For example, they can be used in the manufacture of automobile tires, gaskets, and other rubbery articles.

A more comprehensive understanding of the invention can be obtained by referring to the following illustrative examples which are not intended, however, to be unduly limitative of the invention.

EXAMPLE I 1,3-dilithiobenzene was prepared by reacting 1,3-dibromobenzene with n-butyllithium. The following recipe was employed:

*Table I*

| | |
|---|---|
| 1,3-dibromobenzene _____moles__ | 0.05 |
| n-Butyllithium _____do____ | 0.11 |
| Toluene _____do____ | 1.87 |
| Temperature, ° F. _____ | 122 |
| Time, hours _____ | 24 |

The recipe components were charged to an oven-dried, nitrogen-purged bottle reactor. Toluene was charged first followed by the dibromobenzene and then the butyllithium. The reactor was pressured with argon to 25 p.s.i. and tumbled in a 122° F. bath for 24 hours. As the dilithiobenzene was formed, it precipitated from the reaction mixture as a finely dispersed yellow solid. The solid was separated by centrifuging the mixture, washed once with toluene and once with n-pentane to remove unreacted dibromobenzene and butyllithium, and dispersed in 200 milliliters of nitrogen-purged n-pentane. The yield, determined as total alkalinity by titration of measured aliquots with 0.1 normal hydrochloric acid, was 66.4 percent.

The 1,3-dilithiobenzene was used in variable amounts as the initiator in a series of runs for the polymerization of isoprene. The recipe was as follows:

*Table II*

| | |
|---|---|
| Isoprene _____ parts by wt__ | 100 |
| n-Pentane _____do____ | 1000 |
| Initiator _____do____ | Variable |
| Temperature, ° F. _____ | 122 |
| Time, hours, after initiation _____ | 24 |

The solvent was charged first after which the reactor was purged with nitrogen, the monomer was introduced, and then the initiator.

The solvent was given two passes through a beryl saddle-packed column in a countercurrent flow of nitrogen followed by a single pass through an activated alumina bed. Isoprene was flash distilled in a nitrogen gas stream, condensed and collected in a bottle for storage, and purged with nitrogen before the bottle was capped. It was stored at −4° F. until needed.

Following are the results obtained in the series of polymerizations:

*Table III*

| Run No. | Initiator, mhm.[1] | Induction period, hours | Conv., percent | Microstructure (A), percent normalized | | Inherent (B) viscosity |
|---|---|---|---|---|---|---|
| | | | | cis | 3,4-addition | |
| 1 | 5.00 | <2.5 | 100 | 91.1 | 8.9 | 13.07 |
| 2 | 5.25 | >2.5, <3.5 | 100 | 91.6 | 8.4 | 11.97 |
| 3 | 5.50 | <2.5 | 100 | 91.4 | 8.6 | 11.35 |
| 4 | 5.75 | <2.5 | 100 | | | |
| 5 | 6.25 | >2.5 | 97.6 | | | |
| 6 | 6.75 | <2.5 | 100 | | | |
| 7 | 7.00 | <2.5 | 100 | 91.3 | 8.7 | 11.55 |
| 8 | 10.00 | >1.5, <2.5 | 100 | 92.0 | 8.0 | 9.83 |
| 9 | 20.00 | <1.5 | 100 | 91.6 | 8.4 | 8.12 |
| 10 | 30.00 | <1.5 | 99.5 | 90.0 | 10.0 | 7.38 |

[1] Millimoles per 100 grams isoprene.
NOTE—For (A) and (B) see matter preceding claims.

Microctructure and inherent viscosity data were not determined on the samples for which no values are given. The data show that high inherent viscosity polymers are obtained and that structure and inherent viscosity are not very sensitive to changes in initiator level. Induction periods were relatively short in all runs. All polymers were gel free.

Another series of runs was made for the polymerization of isoprene in which the foregoing procedure was employed except that variable quantities of 1,4-dilithiobenzene were used instead of 1,3-dithio-benzene as the initiator. The following results were obtained.

*Table IV*

| Run No. | Initiator, mhm. | Induction period, hours | Conversion, percent | Microstructure (A), percent normalized | | Inherent (B) viscosity | Gel (C), percent |
|---|---|---|---|---|---|---|---|
| | | | | cis | 3,4-addition | | |
| 1 | 5 | | 0 | | | | |
| 2 | 10 | >24, <96 | 21.9 | gelled | | 3.84 | trace |
| 3 | 20 | >24, <96 | 100 | 89.4 | 10.6 | 7.44 | 0 |
| 4 | 30 | >24, <96 | 62.0 | 88.1 | 11.9 | 5.80 | 0 |

NOTE.—For (A), (B), and (C) see matter prededing claims.

It can be seen from these data that the induction period was long, a high initiator level was required for polymerization, and the results were erratic. For a given initiator level, the inherent viscosity of the polymer was considerably lower than when 1,3-dilithiobenzene was used.

EXAMPLE II

The recipe of Example I was employed for the polymerization of isoprene using an initiator level of 2.5 millimoles per 100 grams isoprene. Quantitative conversion was reached. The induction period on this run was between 2.5 and 3.5 hours. The product had an inherent viscosity of 12.72, a normalized cis-content of 91.0 percent and a normalized 3,4-addition content of 9.0 percent.

The polymer was compounded and cured, and physical properties determined. Following are the compound recipe, processing data, and evaluation data:

*Table V*

COMPOUNDING RECIPE, PARTS BY WEIGHT

| | |
|---|---|
| Polyisoprene _____ | 100 |
| High abrasion furnace black _____ | 50 |
| Zinz oxide _____ | 3 |
| Stearic acid _____ | 3 |
| Flexamine [1] _____ | 1 |
| Philrich 5 [2] _____ | 5 |
| Pepton 22 [3] _____ | 1 |
| Sulfur _____ | 2.25 |
| NOBS Special [4] _____ | 0.5 |

[1] Physical mixture containing 65 percent of a complex diarylamine-ketone reaction product and 35 percent of N,N'-diphenyl-p-phenylenediamine.
[2] Aromatic oil.
[3] 2,2'-dibenzamidodiphenyl disulfide.
[4] N-oxydiethylene-2-benzothiazyl sulfenamide.

*Table VI*

PROCESSING PROPERTIES

| | |
|---|---|
| Extrusion at 195° F. (J): | |
| Inches/minute _____ | 64 |
| Grams/minute _____ | 115.0 |
| Rating (Garvey Die) _____ | 12— |

NOTE.—For (J) see matter preceding claims.

*Table VII*

PHYSICAL PROPERTIES, 45 MINUTES' CURE AT 292° F.

| | |
|---|---|
| $\mu \times 10^4$, (D) moles/cc. _____ | 1.34 |
| 300% modulus, (E) p.s.i. _____ | 1250 |
| Tensil, (E), p.s.i. _____ | 3250 |
| Elongation, (E), percent _____ | 555 |
| Max., tensile at 200° F., p.s.i. _____ | 1840 |
| ΔT, (F) ° F. _____ | 39.9 |
| Resilience, (G), percent _____ | 72.6 |
| Shore A hardness (H) _____ | 57 |

NOTE.—For (D), (E), (F), (G), and (H) see matter preceding claims.

The data show that the rubber had good processing properties and the vulcanizate had good physical properties.

EXAMPLE III

The following recipe was employed for the preparation of 3-bromophenyllithium:

*Table VIII*

| | |
|---|---|
| 1,3-dibromobenzene _____ moles__ | 0.025 |
| n-Butyllithium _____ do____ | 0.025 |
| Toluene _____ do____ | 0.94 |
| Temperature, ° F. _____ | 122 |
| Time, hours _____ | 24 |

The procedure was the same as that described in Example I. The reaction product was used as the initiator for the polymerization of isoprene. The recipe was the same as given in Example I. Results were as follows:

*Table IX*

| Run No. | Initiator, mhm. | Induction period, hours | Conversion, percent | Microstructure (A), percent normalized | | Inherent (B) viscosity | Gel (C), percent |
|---|---|---|---|---|---|---|---|
| | | | | cis | 3,4-addition | | |
| 1 | 4 | >2,<17 | 33.4 | | | | |
| 2 | 5 | >2,<17 | 48.6 | | | | |
| 3 | 6 | >2,<17 | 81.2 | | | | |
| 4 | 7 | >1.5,<2.0 | 84.6 | | | | |
| 5 | 8 | >1.5,<2.0 | 95.4 | 91.1 | 8.9 | 5.38 | 0 |
| 6 | 9 | >1.5,<2.0 | 97.2 | 91.1 | 8.9 | 5.84 | 0 |
| 7 | 10 | >1.5,<2.0 | 96.0 | 90.9 | 9.1 | 5.96 | 0 |
| 8 | 11 | >1.5,<2.0 | 96.2 | | | | |
| 9 | 12 | >1.5,<2.0 | 96.4 | 91.2 | 8.8 | 5.40 | 0 |

NOTE.—For (A), (B), and (C) see matter preceding claims.

These data show that the 3-bromophenyllithium initator is similar to the dilithium initiator of Example I in that structure and inherent viscosity are not very sensitive to changes in initiator level. The inherent viscosity is not so high as it is when the polymers are prepared with the dilithium initiator probably because the halogen substituent is functioning as a modifier for the polymerization. In general the induction periods are short in these runs.

Another series of runs were made for the polymerization of isoprene using the same procedure except that 4-bromophenyllithium was substituted for 3-bromophenyllithium as the initiator. The following results were obtained:

*Table X*

| Run No. | Initiator, mhm. | Induction period, hours | Conversion, percent | Microstructure (A), percent normalized | | Inherent (B) viscosity | Gel (C), percent |
|---|---|---|---|---|---|---|---|
| | | | | cis | 3,4-addition | | |
| 1 | 5 | | 0 | | | | |
| 2 | 10 | | 0 | | | | |
| 3 | 20 | >3,<17 | 52.6 | | | | |
| 4 | 30 | >3,<17 | 100 | 90.7 | 9.3 | 7.02 | 0 |

NOTE.—For (A), (B), and (C) see matter preceding claims.

These data show that a high initiator level was required, conversion was poor except at the highest level, and the cis-content was lower than when 3-bromophenyllithium was employed as the initiator.

EXAMPLE IV

Mixed initiators containing 1,3-dilithiobenzene and 3-bromophenyllithium were prepared by reacting variable quantities of 1,3-dibromobenzene with butyllithium. The recipes were as follows:

*Table XI*

| | A | B | C |
|---|---|---|---|
| 1,3-dibromobenzene, mole | 0.05 | 0.05 | 0.05 |
| n-Butyllithium, mole | 0.0624 | 0.0750 | 0.0874 |
| Toluene, ml | 200 | 200 | 200 |
| Time, hours | 24 | 24 | 24 |
| Temperature, °F | 122 | 122 | 122 |
| Butyllithium/bromobenzene mole ratio | 1.25/1 | 1.50/1 | 1.75/1 |
| Yield, percent [1] | 59.2 | 71.8 | 85.2 |

[1] Based on equivalents of lithium.

The procedure described in Example I was followed for preparation of the initiators. Each of the reaction products was employed in variable amounts of the polymerization of isoprene. The recipe was the same as in Example I. Results are presented in the following table:

*Table XII*

| Initiator | | Induction period, hours | Conv., percent | Microstructure (A), percent normalized | | Inherent (B) viscosity | Gel (C), percent |
|---|---|---|---|---|---|---|---|
| Type | Amount [1] | | | cis | 3,4-addition | | |
| A | 7.0 | >1,<2 | 92.2 | 92.7 | 7.3 | 8.57 | 0 |
| A | 7.5 | >1,<2 | 91.0 | 93.0 | 7.0 | 7.32 | 0 |
| A | 8.0 | >1,<2 | 92.8 | | | | |
| A | 8.5 | >1,<2 | 92.2 | | | | |
| A | 9.0 | >1,<2 | 90.2 | 92.5 | 7.5 | 8.10 | 0 |
| B | 9.5 | ~2 | 4.0 | | | | |
| B | 10.0 | ~2 | 5.0 | | | | |
| B | 10.5 | >2,<17 | 92.8 | 93.1 | 6.9 | 10.63 | 0 |
| B | 11.0 | >2,<17 | 26.0 | | | | |
| B | 11.5 | >2,<17 | 24.6 | | | | |
| B | 12.0 | >2,<17 | 21.2 | | | | |
| C | 9.5 | >2,<17 | 96.0 | 92.7 | 7.3 | 11.22 | 0 |
| C | 10.0 | >2,<17 | 94.8 | 93.3 | 6.7 | 11.26 | 0 |
| C | 10.5 | >2,<17 | 95.2 | | | | |
| C | 11.0 | >2,<17 | 96.0 | 93.1 | 6.9 | 11.09 | 0 |
| C | 11.5 | >2,<17 | 95.0 | | | | |
| C | 12.0 | >2,<17 | 95.2 | 93.5 | 6.5 | 10.71 | 0 |

[1] Milliequivalents Li/100 grams isoprene.
NOTE.—For (A), (B), and (C) see matter preceding claims.

These data show that inherent viscosity can be varied by varying the proportions of mono- and dilithium initiators in the polymerization system. They also show that with a given initiator composition, the structure and inherent viscosity are not very sensitive to changes in initiator level.

EXAMPLE V 3-bromophenyllithium was prepared by reacting n-butyllithium with 1,3-dibromobenzene. The following recipe was employed:

Table XIII

| | | |
|---|---|---|
| 1,3-dibromobenzene | moles | 0.7 |
| n-Butyllithium | do | 0.12 |
| Toluene | do | 3.74 |
| Temperature, °F | | 122 |
| Time, hours | | 24 |

The procedure of Example I was followed. As the 3-bromophenyllithium was formed, it precipitated from the reaction mixture. It was separated by centrifuging the mixture, washed once with toluene and once with n-pentane, and dispersed in 400 milliliters of n-pentane.

The 3-bromophenyllithium was used as the initiator for the polymerization of isoprene. The recipe was the same as given in Example I with the amount of initiator being 3.75 mhm. (millimoles per 100 parts monomer). Polymerization was effected at 122° F. The conversion after 24 hours was 97.3 percent.

The polymer was compounded and cured and physical properties determined. The compounding recipe was the same as given in Example II. Following are the normalized polymer properties, processing data, and evaluation data:

Table XIV
RAW PROPERTIES

| | |
|---|---|
| ML-4 at 212° F. (I) | 82.0 |
| Inherent viscosity (B) | 11.06 |
| Gel, (C) percent | 0 |
| Microstructure, (A) percent: | |
|     cis | 92.8 |
|     3,4-addition | 7.2 |

Note.—For (I), (B), and (A) see matter preceding claims.

Table XV
PROCESSING PROPERTIES

| | |
|---|---|
| Compounded MS-1½ at 212° F. (I) | 45.5 |
| Extrusion at 195° F. (J): | |
|     Inches/minute | 61.0 |
|     Grams/minute | 101.0 |
|     Rating (Garvey Die) | 10 |

Note.—For (I) and (J) see matter preceding claims.

Table XVI
PHYSICAL PROPERTIES, 45 MINUTES' CURE AT 292° F.

| | |
|---|---|
| $\nu \times 10^4$ (D) moles/cc | 1.57 |
| 300 percent Modulus, (E), p.s.i | 1250 |
| Tensile, (E) p.s.i | 3150 |
| Elongation, (E) percent | 555 |
| Max. tensile at 200° F. (E) p.s.i | 2020 |
| $\Delta T$, (F) °F | 40.5 |
| Resilience, (G) percent | 70.7 |
| Shore A hardness (H) | 60.0 |

Note.—For (D), (E), (F), (G), and (H) see matter preceding claims.

The data show that the rubber had good processing properties and the physical properties of the vulcanizate were good.

EXAMPLE VI 1,3-butadiene was polymerized in the presence of 1,3-dilithiobenzene prepared by the method of Example I. The polymerization recipe was as follows:

Table XVII

| | | |
|---|---|---|
| 1,3-butadiene | parts by wt | 100 |
| Cyclohexane | do | 780 |
| 1,3-dilithiobenzene, mhm | | Variable |
| Temperature, °F | | 122 |
| Time, hours | | 24 |

Charge order: solvent-monomer-initiator.

The following results were obtained.

Table XVIII

| Run No. | Initiator, mhm. | Induction per., hrs. | Conversion, percent | Microstructure (K), percent | | | Inherent Viscosity (B) | Gel (C) |
|---|---|---|---|---|---|---|---|---|
| | | | | trans | vinyl | cis | | |
| 1 | 3 | | 9.2 | | | | | |
| 2 | 3.5 | >1, <2 | 11.0 | | | | | |
| 3 | 4 | >1, <2 | 100 | 27.2 | 4.6 | 68.2 | 8.5 | 0 |
| 4 | 4.5 | <1 | 100 | 36.2 | 5.5 | 58.3 | 5.57 | 0 |
| 5 | 5 | <1 | 100 | 37.4 | 5.7 | 56.9 | 5.18 | 0 |
| 6 | 6 | >0.5, <1 | 100 | 31.2 | 5.4 | 63.4 | 6.60 | 0 |
| 7 | 8 | >0.5, <1 | 100 | 35.2 | 5.6 | 59.2 | 5.63 | 0 |

Note.—For (K), (B), and (C) see matter preceding claims.

The above results indicate that 1,3-dilithiobenzene is a satisfactory initiator for the polymerization of 1,3-butadiene. It is especially significant that the above polybutadiene has a significantly higher inherent viscosity and lower vinyl and trans-content than polybutadiene initiated with butyllithium. A typical polybutadiene prepared in the presence of butyllithium has 7.8% vinyl, 49.0% trans, and 2.0 inherent viscosity.

EXAMPLE VII 1,3-butadiene was polymerized in the presence of 3-bromophenyllithium prepared by the method of Example V. The polymerization recipe was as follows:

Table XIX

| | | |
|---|---|---|
| 1,3-butadiene | parts by wt | 100 |
| Cyclohexane | do | 780 |
| 3-bromophenyllithium, mhm | | Variable |
| Temperature, °F | | 122 |
| Time, hrs | | 24 |

Charge order: solvent-monomer-initiator.

The following results were obtained:

Table XX

| Run No. | Initiator, mhm. | Induction per., hrs. | Conversion, percent | Microstructure (K), percent | | | Inherent viscosity (B) | Gel (C) |
|---|---|---|---|---|---|---|---|---|
| | | | | trans | vinyl | cis | | |
| 1 | 5 | >1, <2 | 100 | 33.5 | 5.0 | 61.5 | 6.45 | 0 |
| 2 | 7 | >0.5, <1 | 100 | 36.2 | 5.4 | 58.4 | 6.08 | 0 |
| 3 | 9 | 0.5 | 100 | 39.4 | 5.5 | 55.1 | 5.20 | 0 |

Note.—For (K), (B), and (C) see matter preceding claims.

The above results indicate that 3-bromophenyllithium is a satisfactory initiator for the polymerization of 1,3-butadiene.

(A) Microstructures in the above examples were determined using a commercial infrared spectrometer. The samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of of a high cis-polyisoprene, trans is not detectable, since trans is measured at the 8.75 micron band. The raw cis and raw 3,4-addition are converted to normalized values (assuming cis+3,4-addition=100) as follows:

$$\frac{\text{Raw cis percent}}{\text{Raw cis percent}+\text{raw 3,4-addition, percent}}(100)$$

= normalized cis percent $$\frac{\text{Raw 3,4-addition percent}}{\text{Raw cis percent}+\text{raw 3,4-addition percent}}(100)$$

= normalized 3,4-addition percent (B) One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the orignal sample.

(C) Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.

(D) Swelling method of Kraus, Rubber World 135, 67–73, 254–260 (1956). This value is the number of effective network chains per unit volume of rubber. The higher the number, the more the rubber is crosslinked (vulcanized).

(E) ASTM D412–151T. Scott Tensile Machine L-6. Tests made at 80° F.

(F) ASTM D623–58. Method A. Goodrich Flexometer, 143 lbs./sq. in. load, 0.175 inch stroke. Test specimen is a right circular cylinder 0.7 inch in diameter and one inch high.

(G) ASTM D945–55 (Modified). Yerzley Oscillograph. Test specimen is a right circular cylinder 0.7 inch in diameter and one inch high.

(H) ASTM D676–55T. Shore durometer, Type A.

(I) ASTM D924–57T.

(J) Number ½ Royle Extruder with Garvey Die, see Ind. Eng. Chem. 34, 1309 (1942). As regards the "rating" FIGURE 12 designates an extruded product considered perfectly formed whereas lower numerals indicate less perfect products.

(K) Polymer samples were dissolved in carbon disulfide to form a solution having 25 grams of polymer per liter of solution. The infrared spectrum of each of the solutions (percent transmission) was then determined in a commercial infrared spectrometer.

The percent of the total unsaturation present as trans-1,4- was calculated according to the following equation and consistent units:

$$\epsilon = \frac{E}{tc}$$

where $\epsilon$ equals extinction coefficient (liters-mols$^{-1}$-centimeters$^{-1}$); $E$ equals extinction ($\log I_0/I$); $t$ equals path length (centimeters); and $c$ equals concentration (mols double bond/liter). The extinction was determined at the 10.3 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis-1,4- was obtained by subtracting the trans-1,4- and 1,2- (vinyl), determined according to the above procedures, from the theoretical unsaturation, assuming one double bond per each $C_4$ unit in the polymer.

While certain examples, compositions and process steps have been described for purposes of illustration the invention is not limited to these. Variation and modification within the scope of the disclosure and the claims can be readily effected by those skilled in the art.

I claim:

1. A process for the polymerization of a monomer selected from the group consisting of butadiene, isoprene, and mixtures thereof comprising contacting said monomer under polymerization conditions with an initiator selected from the group consisting of 1,3-dilithiobenzene, 3-bromophenyllithium, 3-bromo-1-naphthyllithium, 3-chlorophenyllithium, 3-chloro-1-naphthyllithium, 3-fluorophenyllithium, 3-fluoro-1-naphthyllithium, 1-chloro-3-naphthyllithium, 1-fluoro-3-naphthyllithium, 1-bromo-3-naphthyllithium, and mixtures thereof.

2. The process of claim 1 where in said initiator comprises 1,3-dilithiobenzene.

3. The process of claim 1 wherein said initiator comprises 3-bromophenyllithium.

4. The process of claim 1 wherein said initiator comprises a mixture of 1,3-dilithiobenzene and 3-bromophenyllithium.

5. The process of claim 4 further comprising controlling the physical properties of the polymerized monomer by varying the molar ratio of said 1,3-dilithiobenzene and said 3-bromophenyllithium in said mixture.

6. A process for the polymerization of a monomer selected from the group consisting of butadiene, isoprene, and mixtures thereof comprising contacting said monomer under polymerization conditions with sufficient 1,3-dilithiobenzene to have in the range of 2 to 80 milliequivalents of lithium present per 100 grams of monomer, in the presence of a liquid hydrocarbon diluent and at a temperature in the range of −100 to 150° C. and recovering the polymer thus produced.

7. A process for the polymerization of a monomer selected from the group consisting of butadiene, isoprene, and mixtures thereof comprising contacting said monomer under polymerization conditions with sufficient 3-bromophenyllithium to have in the range of 2 to 80 milliequivalents of lithium present per 100 grams of monomer, in the presence of a liquid hydrocarbon diluent and at a temperature in the range of −100 to 150° C. and recovering the polymer thus produced.

8. A process for the polymerization of a monomer selected from the group consisting of butadiene, isoprene, and mixtures thereof comprising contacting said monomer under polymerization conditions with a mixture of 1,3-dilithiobenzene and 3-bromophenyllithium in the presence of a liquid hydrocarbon diluent and at a temperature in the range of −100 to 150° C., varying the molar ratio of said 1,3-dilithiobenzene and said 3-bromophenyllithium in said mixture to regulate the properties of the polymer produced, and recovering said polymer.

References Cited by the Examiner

UNITED STATES PATENTS

| | | | |
|---|---|---|---|
| 2,975,160 | 3/61 | Zelinski | 260—83.7 |
| 3,082,264 | 3/63 | West et al. | 252—431 |

FOREIGN PATENTS 817,695  8/59  Great Britain.

JOSEPH L. SCHOFER, *Primary Examiner.*

LEON J. BERCOVITZ, *Examiner.*